United States Patent
Lansbarkis et al.

[11] Patent Number: 5,858,068
[45] Date of Patent: Jan. 12, 1999

[54] PURIFICATION OF CARBON DIOXIDE

[75] Inventors: James R. Lansbarkis, El Dorado; Jon S. Gingrich, Sacramento, both of Calif.

[73] Assignee: UOP LLC, Des Plaines, Ill.

[21] Appl. No.: 947,721

[22] Filed: Oct. 9, 1997

[51] Int. Cl.⁶ ............................................ B01D 53/04
[52] U.S. Cl. ........................ 95/116; 95/136; 95/137; 95/138; 95/143; 95/902
[58] Field of Search ............... 95/114–118, 135–138, 95/141–143, 902

[56] References Cited

U.S. PATENT DOCUMENTS

| | | | |
|---|---|---|---|
| 3,816,975 | 6/1974 | Collins | 95/136 X |
| 4,425,143 | 1/1984 | Nishizawa et al. | 95/138 X |
| 5,089,244 | 2/1992 | Parent et al. | 95/116 X |
| 5,146,039 | 9/1992 | Wildt et al. | 95/141 X |
| 5,181,942 | 1/1993 | Jain | 95/141 X |
| 5,248,488 | 9/1993 | Yan | 95/117 X |
| 5,256,173 | 10/1993 | Rastelli | 95/141 |
| 5,271,914 | 12/1993 | Sugimoto et al. | 95/141 |
| 5,536,301 | 7/1996 | Lansbarkis et al. | 95/141 X |
| 5,557,030 | 9/1996 | Markovs et al. | 95/141 X |
| 5,609,842 | 3/1997 | Tsybulevski et al. | 95/136 X |

FOREIGN PATENT DOCUMENTS

| | | | |
|---|---|---|---|
| 0586830 | 3/1994 | European Pat. Off. | 95/117 |
| 1565498 | 5/1990 | U.S.S.R. | 95/136 |

*Primary Examiner*—Robert Spitzer
*Attorney, Agent, or Firm*—Thomas K. McBride; Frank S. Molinaro; Maryann Maas

[57] ABSTRACT

Industrial grade carbon dioxide may contain unacceptable amounts of sulfur-containing materials, oxygen, and organic materials particularly detrimental to food-related uses of $CO_2$. These can be effectively removed by a bed of silver-exchanged faujasite and an MFI-type molecular sieve. This permits an on-site, on-demand method of purifying $CO_2$ ranging from laboratory to tank car seals.

5 Claims, No Drawings

PURIFICATION OF CARBON DIOXIDE

BACKGROUND OF THE INVENTION

Carbon dioxide has been known for centuries, with Pliny the Elder describing it in the context of poisonous vapors coming from caverns. In the seventeenth century, Van Helmont obtained carbon dioxide by such means as fermentation and acidification of carbonates, and also studied many of its properties. Later it was recognized as an acidic gas but it was not until the end of the eighteenth century that Lavoisier recognized it as a compound of carbon and oxygen of a given proportion.

Since mineral waters (solutions of carbon dioxide in water) were thought to have medicinal properties, there was from the onset an incentive to commercially exploit carbon dioxide. Farady made liquid and solid carbon dioxide using a hydraulic pump and studied solid carbon dioxide as a refrigerant. Its uses over time has proliferated to include such diverse applications as beverage carbonation, chemical manufacture, fire fighting, food freezing, greenhouses, oil well secondary recovery, as an atmosphere in welding, and even more recently in supercritical extraction processes.

The bulk of carbon dioxide is generated from ammonia and hydrogen plants as process gas carbon dioxide resulting from the reaction between hydrocarbons and steam. The carbon dioxide produced by such methods has a high purity but may contain, inter alia traces of hydrogen sulfide, sulfur dioxide, and hydrocarbons which are particularly detrimental to its use in the food and drink industries. Since approximately 18% of the carbon dioxide produced is used for beverage carbonation, removal of these impurities from carbon dioxide is of major commercial import. Carbon dioxide is also used in the handling and transportation of foodstuffs since the growth of bacteria can be prevented by using carbon dioxide to forestall oxidation leading to a loss of flavor. Coffee is packed under carbon dioxide, and fruits, vegetables, and cereals often are transported in an atmosphere of carbon dioxide. For all such foodstuff-related uses, the presence of contaminants which lead to an unacceptable odor or taste should be less than one milligram/kg. This application is concerned with purification of for use in foodstuffs and in other areas, such as supercritical extraction and supercritical chromatography, where high purity carbon dioxide is required.

The most commonly used purification methods are treatments with potassium permanganate, potassium dichromate, or active carbon. Both potassium permanganate and potassium dichromate are active oxidizing agents, consequently scrubbing generally results in oxidation of unwanted materials. In the case of hydrogen sulfide as a contaminant, oxidation results in the formation of sulfur which is readily removed as a solid. Activated carbon has been widely used as an adsorbent for impurities from carbon dioxide. Nonetheless, the presence of residual impurities often remains a problem in providing food-grade carbon dioxide which meets the Compressed Gas Association commodity specifications or which can otherwise be used in supercritical applications. Where water is necessary to be removed from the gas, a separate drying step over alumina has sometimes been used in the past.

Although the commercial production of carbon dioxide has been ongoing for many years now, and although the purification of the gas has been the subject of many efforts, nonetheless a truly high purity carbon dioxide is expensive to process and not widely available. By "high purity carbon dioxide" is meant carbon dioxide having more than 15 parts per billion (ppb) COS, no more than 1 part per million (ppm) of oxygen, and no more than 10 parts per trillion (ppt) of organic materials. In particular, we have found that impurities such as water, alcohols, sulfur and nitrogen containing species, and hydrocarbons may be removed by a combination of adsorbents very effectively and very efficiently.

SUMMARY OF THE INVENTION

The invention described within is a method of purifying gaseous carbon dioxide. In particular, our invention is a process for preparing high purity carbon dioxide suitable for use in carbonated beverages, as well as other food-related applications (that is, food grade carbon dioxide) as well as a process for purifying carbon dioxide to a level suitable for use in supercritical extraction and supercritical chromatography. An embodiment comprises passing gaseous carbon dioxide through one or more beds containing a mixture of silver-exchanged faujasite and an MFI-type molecular sieve with a Si:Al ratio of at least 10. In a more specific embodiment the molecular sieve is ZSM-5. In a still more specific embodiment the molecular sieve is ZSM-5 and the ratio of faujasite to ZSM-5 is about 1. Other embodiments and applications will be apparent from the ensuing description.

DESCRIPTION OF THE INVENTION

The need for high purity carbon dioxide in food-related applications, such as in carbonated beverages as well as food storage, is well documented. Additionally, there is a need for high purity carbon dioxide in such applications as supercritical extraction and supercritical chromatography. Our invention is a process for purifying carbon dioxide to sufficient levels as to enable its use in the foregoing applications. Our purification process relies on a mixture of silver-exchanged faujasite and an MFI-type molecular sieve with a Si:Al ratio of at least 10 to remove sulfur compounds, especially hydrogen sulfide, and hydrocarbons often present in industrial grade carbon dioxide at unacceptably high levels. The use of additional adsorbents, e.g., zeolites such as 3A, 4A and 5A, is optional but they may be employed to remove other impurities such as water where desired.

An advantage of our method is that the purification is conveniently done on-site, on demand, and is conveniently scaled from relatively small to quite large amounts of carbon dioxide. For example, one may purify small quantities of carbon dioxide for laboratory use from a tank of carbon dioxide using a cartridge containing the materials described within affixed to the tank outlet, with carbon dioxide being purified as it is drawn from the tank. At another end of the scale, carbon dioxide may be generated, and/or stored in large quantities on-site, then purified by passage through commensurately sized beds of adsorbent as described within. The core advantage of our invention in both cases is that carbon dioxide is purified as and when used, which is inherently a more efficient process of purification than one which purifies the carbon dioxide long before it is used.

The adsorbent which serves to purify the carbon dioxide is a mixture of silver-exchanged faujasite and an MFI-type molecular sieve. The faujasite may be silver exchanged to the extent of from about 5 up to about 90%. That is, from about 5 up to about 90 percent of the available sites in faujasite are exchanged with silver, which corresponds to material having 0.1–3 weight percent silver. The molecular sieve in our adsorbent is one of the MFI-type molecular sieves with a Si:Al ratio of at least 10 (i.e., silica:alumina is at least 20) and preferably greater than about 20. Examples of suitable molecular sieves include ZSM-5, ZSM-12, ZSM- 23 and silicalite. Generally, the faujasite and molecular sieve will be used in a weight ratio from about 1:3 to about 3:1 although normally the exact ratio of components is not critical to the success of our invention. We have found that molecular sieves with a pore diameter in the 4–6 angstrom range are especially suitable in the practice of our invention.

The foregoing mixture of adsorbents has been found to be well suited for the removal of sulfur compounds, especially hydrogen sulfide, and hydrocarbons which are likely to be found as impurities in gaseous carbon dioxide. We also have found that zeolites such as 3A, 4A, and 5A also may be used optionally as a prebed, especially to remove other impurities such as water. Whether other zeolites or molecular sieves are used in combination with the faujasite-MFI adsorbent is largely a matter of choice and depends mainly upon the nature of the impurities to be removed from the carbon dioxide stream.

Our invention is carried out in a relatively uncomplicated way, merely by passing a stream of gaseous carbon dioxide through one or more beds of adsorbent. One may use only a single bed containing a mixture of adsorbents, a bed containing different adsorbents in layers, or one can use more than one bed, each of a particular adsorbent. It is also possible to practice our invention using some combination of the foregoing. Which method is chosen is largely a matter of choice and the success of our invention is generally not dependent thereon.

The following example is merely illustrative of our invention and is not intended to limit it in any way.

EXAMPLE

The carbon dioxide used was specified to contain less than 100 ppm total non-condensables (oxygen, nitrogen, and methane) with moisture in the 10–50 ppm range and oxygen up to 20 ppm. The gas also contained amounts of organic greases, e.g., a perfluoropolyether and chlorotrufluoroethane, at levels of 1–10 ppm. The gas was passed through a bed of 500 ml of a 1:1 mixture of silver-exchanged faujasite and ZSM-5 to afford a purified carbon dioxide containing less than 1 ppm each of water and oxygen, and less than 10 parts per trillion of organic materials.

In another test carbon dioxide containing 11.2 ppm of carbonyl sulfide, COS, was passed through a bed similar to the one described above. Carbonyl sulfide was used as representative of sulfur compounds to be removed from carbon dioxide. No detectable sulfur was present under conditions where the limit of detection was 1 part per billion.

The foregoing tests demonstrate the capability of our invention to remove sulfur compounds, organic materials, water and oxygen from a carbon dioxide stream to afford high purity carbon dioxide.

What is claimed is:

1. A method of purifying gaseous carbon dioxide comprising passing a stream of carbon dioxide through at least one bed of silver-exchanged faujasite and a MFI-type molecular sieve with a Si:Al ratio greater than about 10, where said faujasite and said sieve are in a proportion from about 1:3 to about 3:1, and recovering purified carbon dioxide having no more than 15 ppb COS, 1 ppm oxygen, and 10 ppt organic materials.

2. The method of claim 1 where the Si:Al ratio of said molecular sieve is greater than about 20.

3. The method of claim 1 where said molecular sieve is selected from the group consisting of ZSM-5, silicalite, ZSM-12, and ZSM-23.

4. The method of claim 1 further characterized in that said carbon dioxide is additionally passed through a bed containing one or more of zeolites 3A, 4A, and 5A.

5. The method of claim 1 where from about 5 up to about 90 percent of the available sites on faujasite are exchanged with silver.

* * * * *